United States Patent [19]

Olszewski et al.

[11] 4,142,878

[45] Mar. 6, 1979

[54] MOLDING HYDROSILICATE MATERIALS

[75] Inventors: Anthony R. Olszewski, Bath; Donald R. Parnell, Big Flats, both of N.Y.

[73] Assignee: Corning Glass Works, Corning, N.Y.

[21] Appl. No.: 830,603

[22] Filed: Sep. 6, 1977

[51] Int. Cl.$^2$ .................. C03B 23/20; C04B 31/00; C03C 15/00

[52] U.S. Cl. ........................... 65/18; 65/30 R; 65/68; 65/DIG. 14; 106/74; 264/32; 264/328

[58] Field of Search ............ 65/DIG. 14, 30 R, 18, 65/68; 106/74; 264/63, 328, 32

[56] References Cited

U.S. PATENT DOCUMENTS

| | | | |
|---|---|---|---|
| 3,814,593 | 6/1974 | Parris | 65/305 |
| 3,912,481 | 10/1975 | Bartholomew et al. | 65/30 R |
| 3,948,629 | 4/1976 | Bartholomew et al. | 65/30 R |
| 4,018,858 | 4/1977 | Walters et al. | 264/63 X |
| 4,026,692 | 5/1977 | Bartholomew | 65/68 X |
| 4,059,425 | 11/1977 | Brydges et al. | 106/74 X |

*Primary Examiner*—S. Leon Bashore
*Assistant Examiner*—Frank W. Miga
*Attorney, Agent, or Firm*—Clinton S. Janes, Jr.; Clarence R. Patty, Jr.

[57] ABSTRACT

The present invention is founded upon the fundamental discovery that anhydrous silicate materials can be formed into solid bodies which are hydrated or wherein the silicate structure is depolymerized by protonic reagents other than water. Such bodies can be produced by compression molding the anhydrous silicate material with water or other protonic reagent at elevated temperatures and high pressures.

10 Claims, No Drawings

MOLDING HYDROSILICATE MATERIALS

Background of the Invention

U.S. Pat. No. 3,498,802 describes the hydration of alkali metal silicate glass powders to produce thermoplastic materials and hydraulic cements. The glass powders consisted essentially, expressed in mole percent on the oxide basis, of about 80–94% $SiO_2$ and 6–20% $Na_2O$ and/or $K_2O$, the sum of those components constituting at least 90 mole percent of the total composition. Numerous compatible metal oxides such as PbO, BaO, MgO, $B_2O_3$, $Al_2O_3$, and ZnO were noted as being operable optional ingredients, but CaO and $Li_2O$ were stated to be desirably absent.

The process parameters of the hydration practice comprised contacting the glass powders with a gaseous environment containing at least 50% by weight of water at a pressure of at least one atmosphere and at a temperature customarily within the range of about 100°–200° C. The hydration process was continued for a period of time sufficient to yield at least a surface layer on the powders containing up to 30% by weight of $H_2O$. The hydrated powders were observed to become adhesive and cohesive at temperatures between about 80°–120° C. which permitted shaping into bulk bodies via such conventional forming means as pressing, rolling, extrusion and injection molding.

U.S. Pat. No. 3,912,481 discloses a method for making hydrated alkali metal silicate materials which can demonstrate forming characteristics and physical behaviors approaching those exhibited by high polymer organic plastics. The method involves a two-step process — first, the materials are hydrated and, second, the materials are partially dehydrated.

The operable glass compositions consist essentially, expressed in mole percent on the oxide basis, of about 3–25% $Na_2O$ and/or $K_2O$ and 50–95% $SiO_2$, the total of those ingredients comprising at least 55 mole percent of the complete composition. A number of compatible metal oxides such as $Al_2O_3$, BaO, $B_2O_3$, CaO, MgO, PbO, CdO, and ZnO can advantageously be added to improve melting and forming of the glass and/or to modify the chemical and physical properties of the hydrated glass. PbO, CaO, ZnO, and $B_2O_3$ are operable in amounts up to 25%, MgO is useful in quantities up to 35%, BaO and $Al_2O_3$ can be included at values up to 20%, and additions of other optional oxides are preferably held below 10%. Since $Li_2O$ inhibited hydration, no more than about 5% could be tolerated.

The method of hydration disclosed in that patent involved two steps. First, the glass was contacted at temperatures above 100° C. with a gaseous $H_2O$-containing environment at a sufficiently high $H_2O$ pressure to achieve a saturated or near saturated atmosphere. The contact is continued until at least a surface portion of the glass is saturated with $H_2O$. The amount of $H_2O$ diffused within the glass is a function of the glass composition, and can vary from less than 5% by weight up to about 35% by weight. Second, the water content of the saturated glass is reduced by contacting at elevated temperatures with a gaseous environment of lower relative humidity. Although the glass can be dehydrated to an essentially anhydrous state, the water content is commonly reduced to between about 1–12% by weight, depending upon glass composition, such that the glass will contain sufficient water to demonstrate thermoplastic properties. The method permits good control of the water content in the final glass.

U.S. Application Ser. No. 445,454, filed Feb. 24, 1974 in the names of J. E. Pierson and W. H. Tarcza, abandoned in favor of continuation-in-part Ser. No. 822,877, filed Aug. 7, 1977, describes a single-step hydration procedure applied to small-dimensioned glass bodies having the same compositions as those operable in U.S. Pat. No. 3,912,481 supra. The method contemplates exposing the fine-dimensioned glass bodies to gaseous environments having relative humidities ranging between 5–50% at temperatures in excess of 225° C. The water absorbed, normally about 1–25% by weight, depending upon the glass composition, imparts thermoplastic properties to the glass.

Nevertheless, whereas the above three disclosures described methods for hydrating alkali metal silicate materials to thereby yield bodies exhibiting thermoplastic characteristics, each method required a substantial period of time to achieve the desired hydration. With certain compositions, the rate of hydration became, in essence, impractically slow.

OBJECTIVES OF THE INVENTION

The principal objective of the instant invention is to provide a method for transforming a mixture of anhydrous silicate materials and water with optional additives into solid hydrosilicate bodies via a single step process of short duration.

Another objective of the instant invention is to substitute for water in whole or in part other protonic reagents which can depolymerize silica such that solid bodies analogous to hydrosilicate bodies are produced.

SUMMARY OF THE INVENTION

We have discovered that the above objectives can be achieved through combining the anhydrous silicate materials with water and/or other protonic reagent capable of depolymerizing silica and then forming a body therefrom at elevated temperatures and under high pressures. The high pressure molding, denominated hydromolding, will be conducted in a closed system at temperatures of at least 100° C. and at pressures of at least about 500 psi. The invention is useful with compositions such as are recited in U.S. Pat. No. 3,912,481 and application Ser. No. 445,454, supra. Thus, the hydromolding can be carried out on actual glasses or on the batch ingredients from which a glass can be derived. Customarily, however, a more homogeneous body will be produced where glass constitutes the charge for compression molding. Compositions operable in the invention consist essentially, in mole percent on the oxide basis, of about 3–25% $Na_2O$ and/or $K_2O$ and 50–95% $SiO_2$, the sum of those components constituting at least 55 mole percent of the total composition. PbO, CaO, ZnO, and $B_2O_3$ can be included in amounts up to 25%, BaO and $Al_2O_3$ can be useful in quantities up to 20%, and MgO may advantageously be present in amounts up to 35%. In general, additions of other compatible metal oxides, e.g., CdO, $TiO_2$, $ZrO_2$, $WO_3$, $P_2O_5$, and $SnO_2$ will be held below 10% in individual amounts. $Li_2O$ appears to impede hydration and hazard devitrification so, if present, will be maintained below 5%.

It is also possible to modify the glass composition by including inorganic additives during the hydromolding process. Hence, such additives can be blended homogeneously with the glass charge to the compression mold which will become an integral part of the pressed solid body.

Water or other protonic reagent content of at least 5% by weight has been found necessary to achieve homogeneous bodies. Amounts in excess of 50% by weight may be employed but such amounts generally afford weak bodies.

The preferred molding temperatures range between about 200°-350° C. At temperatures approaching 500° C., cracking temperatures tend to cause increased wear on the mold and sealing system required to prevent leaks. A molding pressure of at least about 500 psi has been found necessary. Pressures above about 25,000 psi can be employed but with no evident property advantage.

The process of the invention is also advantageous in permitting the ready shaping of glass bodies from difficultly-hydratable glasses, i.e., glasses containing less than about 10% $Na_2O$ and/or $K_2O$.

DESCRIPTION OF PREFERRED EMBODIMENTS

Table I reports glass compositions, expressed in mole percent on the oxide basis, which were found to be operable in the present invention. The production of glass from such compositions comprises no part of the instant invention and is well within the capability of the man of ordinary skill in the glassmaking art. U.S. Pat. No. 3,912,481, supra, describes the manufacture of similar glasses on a laboratory scale and those production parameters would have equivalent utility here.

TABLE I

|  | 1 | 2 | 3 | 4 | 5 | 6 | 7 | 8 |
|---|---|---|---|---|---|---|---|---|
| $SiO_2$ | 74.6 | 84.4 | 73.6 | 73.8 | 72.8 | 77.2 | 73.8 | 76.0 |
| $Na_2O$ | 25.4 | 15.6 | 13.2 | 10.3 | 11.8 | 10.7 | 19.0 | 10.9 |
| $K_2O$ | — | — | — | — | — | 3.0 | — | 3.1 |
| ZnO | — | — | 13.2 | 15.9 | 15.4 | 7.8 | 7.2 | 7.9 |
| $Al_2O_3$ | — | — | — | — | — | 1.3 | — | 1.2 |
| $P_2O_5$ | — | — | — | — | — | — | — | 0.9 |

|  | 9 | 10 | 11 | 12 | 13 | 14 | 15 | 16 | 17 |
|---|---|---|---|---|---|---|---|---|---|
| $SiO_2$ | 76.3 | 76.1 | 68.6 | 81.1 | 81.1 | 81.1 | 69.8 | 54.2 | 77.8 |

TABLE I-continued

| ZnO | 7.9 | 7.9 | — | — | — | — | — | — | — |
|---|---|---|---|---|---|---|---|---|---|
| $Al_2O_3$ | 1.2 | 1.2 | — | — | — | — | 1.8 | 2.0 | 1.5 |
| $WO_3$ | 0.6 | — | — | — | — | 5.4 | — | — | — |
| $SnO_2$ | — | 0.8 | — | — | — | — | — | — | — |
| MgO | — | — | 16.4 | — | — | — | — | — | — |
| NiO | — | — | — | 5.4 | — | — | — | — | — |
| CdO | — | — | — | — | 5.4 | — | — | — | — |
| PbO | — | — | — | — | — | — | 18.2 | 13.9 | 9.6 |
| BaO | — | — | — | — | — | — | — | 13.1 | — |
| $TiO_2$ | — | — | — | — | — | — | — | 3.8 | — |
| $ZrO_2$ | — | — | — | — | — | — | — | 4.2 | — |

| $Na_2O$ | 10.9 | 10.9 | 15.0 | 13.5 | 13.5 | 13.5 | 4.6 | 5.0 | 4.5 |
| $K_2O$ | 3.1 | 3.1 | — | — | — | — | 5.6 | 3.8 | 6.6 |

Stainless steel compression molds with TEFLON ® or other sealing means were employed to insure a leak-free system. The glass was pulverized and the resulting particles placed in the mold cavity. A predetermined quantity of water was added thereto, the sealing means placed in position, the mold plunger introduced into the mold cavity, the mold heated to a temperature of at least 100° C., and a pressure of at least 500 psi applied to the mixture of water and glass particles to yield flat discs.

Table II reports a number of exemplary compression molding trials undertaken with various compositions from Table I. The mesh sizes recorded therein refer to United States Standard Sieves wherein:

20 mesh = 841 microns
40 mesh = 420 microns
80 mesh = 177 microns
100 mesh = 149 microns
120 mesh = 125 microns
200 mesh = 74 microns
400 mesh = 37 microns The quantities of glass and water are expressed in parts by weight and the % $H_2O$ tabulated refers to that present before the pressing operation. The pressing time is expressed in minutes and the visual description reflects the appearance of the molded body after removal from the mold. As used in Table II, the term "tough" indicates that the discs were very difficult to break when flexed by hand.

TABLE II

| Example No. | Mesh Size | Amount Glass | Amount $H_2O$ | % $H_2O$ | Molding Temperature | Applied Pressure | Time at Temperature | Visual Description |
|---|---|---|---|---|---|---|---|---|
| 3 | −100 | 1.5 | 1.0 | 40 | 325° C. | 5000 psi | 15 | Opaque, not completely hydrated |
| 3 | −100 | 1.5 | 1.0 | 40 | 350° C. | 10,000 psi | 15 | Glassy, two regions gold and white |
| 3 | −80 + 100 | 1.5 | 0.8 | 35 | 400° C. | 10,000 psi | 20 | Glassy, some cracking, translucent, gold |
| 3 | −200 | 1.5 | 0.8 | 35 | 350° C. | 14,000 psi | 60 | Opaque, glassy, cracked |
| 4 | −200 | 1.5 | 1.0 | 40 | 350° C. | 10,000 psi | 10 | Glassy, two regions- clear and white |
| 5 | −200 | 1.5 | 0.8 | 35 | 350° C. | 10,000 psi | 10 | Opaque, white, surfaces hydrated |
| 8 | −40 + 80 | 2.0 | 1.0 | 33 | 325° C. | 10,000 psi | 10 | Clear glass with some imperfections |
| 9 | −40 + 80 | 2.0 | 1.0 | 33 | 325° C. | 10,000 psi | 10 | Clear glass, some cracking |
| 10 | −40 + 80 | 2.0 | 1.0 | 33 | 325° C. | 10,000 psi | 10 | Clear gold mass |
| 12 | −20 + 40 | 1.0 | 1.0 | 50 | 325° C. | 5000 psi | 10 | Glassy, opaque green |
| 12 | −40 + 80 | 1.0 | 1.0 | 50 | 325° C. | 10,000 psi | 10 | Glassy, opaque green |
| 13 | −40 + 80 | 1.55 | 1.0 | 39 | 325° C. | 10,000 psi | 5 | Translucent white glass |
| 14 | −40 + 80 | 1.5 | 0.8 | 35 | 325° C. | 10,000 psi | 10 | Opaque, grainy |
| 15 | −100 | 1.94 | 1.0 | 34 | 350° C. | 10,000 psi | 30 | Opaque, not completely hydrated |
| 15 | −400 | 2.0 | 1.0$^a$ | 33 | 325° C. | 10,000 psi | 20 | Clear glass, some cracks |
| 16 | −200 | 3.0 | 1.0$^a$ | 25 | 350° C. | 10,000 psi | 10 | Opaque, white |
| 16 | −200 | 2.0 | 1.0$^b$ | 33 | 350° C. | 10,000 psi | 15 | Opaque, white, glassy |
| 16 | −200 | 3.0 | 1.0$^c$ | 25 | 325° C. | 10,000 psi | 10 | Opaque, white, tough |
| 16 | −40 + 80 | 2.0 | 1.0$^c$ | 33 | 300° C. | 5,000 psi | 15 | Clear glass with few white particles |

$^a$aqueous solution containing 5% by weight NaOH and 2% by weight $K_2S_2O_8$
$^b$aqueous solution containing 2% by weight $K_2S_2O_8$
$^c$aqueous solution containing 1% by weight $K_2S_2O_8$ Table II is illustrative of the operable process parameters of the invention. Thus, variations in temperatures.

pressures, and water contents are explored therein. Inasmuch as the rate of hydration is a function of those three parameters, assuming the composition of the material and the bulk of the final product are held constant, the time required to achieve a solid glassy hydrated body is quite obviously dependent upon those parameters. At very high temperatures and pressures, and where the material has a composition which is readily hydratable, essentially no hold period as such will be necessary. This feature permits the high speed production of pressed articles. However, as will be readily appreciated, where the composition is difficultly hydratable, substantial periods of time, e.g., 10–20 minutes, may be demanded for complete hydration. Longer pressing times, i.e., in excess of one hour, may be successfully employed but do not appear to impart substantially different properties to the final product and are also uneconomical. Also, very extended pressing times can hazard the development of devitrification in the product. However, such attention to those parameters are well within the technology of one of ordinary skill in the art.

Although water contents below about 5% by weight can be successfully utilized with certain glass compositions, higher temperatures and pressures are required which result in increased wear on the molding equipment. With difficulty hydratable compositions, such low water contents are essentially impractical since the time required becomes quite excessive. With water contents much above about 50%, the the body can become quite weak.

As is self-evident, the size of the initial bodies to be hydrated affects the time necessary for complete hydration and consolidation into a solid glassy mass. Although it is obvious that larger diameter starting materials could be used, customarily, a thickness not exceeding about 15 mm will be employed with a maximum thickness not exceeding about 2 mm. being greatly preferred.

The legend terminology employed in Table II is also utilized in Table III.

TABLE III

| Example No. | Mesh Size | Amount Glass | Amount H$_2$O | % H$_2$O | Molding Temperature | Applied Pressure | Time at Temperature | Visual Description |
|---|---|---|---|---|---|---|---|---|
| 6 | −40 + 80 | 2.0 | 0.9 | 31 | 325° C. | 21,000 psi | — | Clear glass, some cracking |
| 6 | −40 + 80 | 3.0 | 0.2 | 6 | 375° C. | 14,000 psi | — | Clear glass, some cracking |
| 6 | −80 + 100 | 2.0 | 0.5 | 20 | 325° C. | 3,000 psi | 10 | Clear glass |
| 6 | −200 | 1.5 | 0.8 | 35 | 450° C. | 1,000 psi | 10 | Opaque brown glass |
| 6 | −200 | 1.5 | 0.8 | 35 | 325° C. | 10,000 psi | 10 | Clear gold glass |
| 6 | −40 | 1.5 | 0.8 | 35 | 325° C. | 10,000 psi | 10 | Clear glass |
| 6 | −40 + 100 | 2.0 | 0.2 | 9 | 325° C. | 10,000 psi | 10 | Clear glass, some surface cracking |
| 6 | −40 + 100 | 3.0 | 1.0 | 25 | 500° C. | 10,000 psi | 10 | Clear glass, some delamination |
| 6 | −40 + 100 | 3.0 | 1.0 | 25 | 150° C. | 10,000 psi | 20 | Only compacted |
| 6 | −40 + 80 | 3.0 | 1.0 | 25 | 200° C. | 5,000 psi | 10 | Only compacted |
| 6 | −40 + 80 | 3.0 | 1.0 | 25 | 200° C. | 10,000 psi | 60 | Opaque, one face glassy |
| 6 | −40 + 80 | 3.0 | 1.0 | 25 | 200° C. | 15,000 psi | 10 | One-third of disc clear glass |
| 6 | −40 + 100 | 3.0 | 1.0 | 25 | 250° C. | 10,000 psi | 10 | Clear glass |

The method of the invention also enables the synthesis of hydrated glass from glass batch components. Table IV records a number of examples illustrating this embodiment of the invention. In the examples, the silica component consisted of a low-iron sand and the other ingredients added to react with the sand were in the form of reagent grade powders except where a saturated aqueous solution provided both the water and the reacting component. The operational parameters outlined above for the hydromolding of glass particles into a hydrated glass mass are equally applicable here. Likewise, the legend terminology employed in Tables II and III is also utilized in Table IV.

TABLE IV

| Example No. | Sand Amount Size | Amount Sand | H$_2$O | Reactant | Amount Reactant | Molding Temperature | Applied Pressure | Time at Temperature | Visual Description |
|---|---|---|---|---|---|---|---|---|---|
| 20 | −80 + 120 | 3.0 | 0.2 | KOH | 1.0 | 400° C. | 15,000 psi | 60 | Opaque, white, tough |
| 21 | −600 | 4.0 | — | Saturated KOH solution | 0.5 | 400° C. | 5,000 psi | 60 | Opaque, white, weak |
| 22 | −600 | 4.0 | — | Saturated KOH solution | 1.0 | 400° C. | 13,000 psi | 10 | Opaque, white, weak |
| 23 | −600 | 4.0 | 1.0 | NaOH | 1.0 | 300° C. | 15,000 psi | 15 | Opaque, tough, discolored |
| 24 | −80 + 120 | 3.0 | 1.0 | NaOH | 1.0 | 325° C. | 4,000 psi | 30 | Opaque, white, tough, glassy |
| 25 | −80 + 120 | 2.0 | 0.4 | NaOH | 0.96 | 350° C. | 10,000 psi | 10 | Translucent, glassy |
| 26 | −600 | 2.0 | 1.0 | NaOH | 1.33 | 325° C. | 10,000 psi | 15 | Opaque, white, tough |
| 27 | −80 + 120 | 2.0 | 1.0 | NaOH | 1.33 | 350° C. | 10,000 psi | 20 | Translucent, glassy |
| 28 | −600 | 2.43 | 1.0 | NaOH / Zn(OH)$_2$ | 0.84 / 0.32 | 400° C. | 15,000 psi | — | Compacted only |
| 29 | −80 + 120 | 2.5 | 1.0 | NaOH / ZnCl$_2$ | 1.0 / 0.5 | 300° C. | 15,000 psi | 5 | Opaque, white, tough |
| 30 | −80 + 120 | 2.5 | 1.0 | NaOH / Zn(OH)$_2$ | 1.0 / 0.5 | 325° C. | 10,000 psi | 20 | Opaque, white, tough |
| 31 | −80 + 120 | 2.0 | 1.0 | NaOH / Mg(OH)$_2$ | 1.0 / 0.5 | 400° C. | 10,000 psi | 10 | Opaque, white, tough |
| 32 | −80 + 120 | 2.0 | 1.0 | NaOH / Zn(OH)$_2$ | 1.0 / 0.5 | 400° C. | 10,000 psi | 10 | Opaque, glassy |

Table V reports a group of examples wherein the glass compositions of Table I were modified with inorganic additives during hydromolding. The same basic operational parameters reported in conjunction with Tables II–IV are also applicable in this embodiment of the invention. Likewise, the legend terminology recited in those Tables is equally appropriate here.

The additives employed were in the form of reagent grade powders except for the boric acid, phosphoric acid, sulfuric acid, and ammonium hydroxide, which were present in concentrated aqueous solutions, and the ethanol, acetic acid, and methanol.

form, shiny discs can be formed which appear to be tough when flexed by hand.

Table VI lists several examples wherein the glass compositions of Table I were modified with organic reactants either with or without added water. The organic reactants were incorporated as chemically pure liquids.

In general, the same basic operational parameters recited in the description of Tables II-V are also functional in this embodiment of the invention. Likewise, the legend terminology utilized in those Tables is equally applicable here.

| Example No. | Glass Size | Amount Glass | Amount $H_2O$ | % $H_2O$ | Reactant | Amount Reactant | % Reactant | Molding Temperature | Applied Pressure | Time at Temperature | Visual Description |
|---|---|---|---|---|---|---|---|---|---|---|---|
| 1 | −40 | 3.9 | 0.9 | 18 | $AlCl_3$ | 0.1 | 2 | 325° C. | 2,000 psi | 5 | Translucent glass |
| 1 | −40 | 2.0 | 0.8 | 27 | $B_2O_3$ | 0.2 | 7 | 250° C. | 5,000 psi | 10 | White phases in clear glass |
| 2 | −40 | 2.5 | 1.0 | 24 | $PbCl_2$ / $Al(OH)_3$ | 0.55 / 0.05 | 13 / 1 | 325° C. | 2,000 psi | 15 | Opaque, glassy, black grains |
| 2 | −40 | 3.0 | — | — | $NH_4OH$ | 0.9 | 23 | 325° C. | 4,000 psi | — | Translucent glass |
| 2 | −40 | 2.0 | 0.3 | 12 | Aluminum fluoride hydrate | 0.2 | 8 | 250° C. | 10,000 psi | 20 | Compacted only |
| 3 | −200 | 1.5 | — | — | $NH_4OH$ | 0.9 | 37 | 400° C. | 5,000 psi | 10 | Translucent gold glass |
| 6 | −40 + 80 | 1.0 | 17 | NaOH / $KH_2PO_4$ | 0.007 / 0.007 | 0.1 / 0.1 | 325+ C. | 14,000 psi | — | Clear glass |
| 6 | −100 | 3.0 | 1.0 | 20 | $B_2O_3$ | 1.0 | 20 | 325° C. | 19,000 psi | — | Opaque, white, grainy |
| 6 | −100 | 3.0 | 0.5 | 12 | $H_3PO_4$ | 0.5 | 12 | 325° C. | 15,000 psi | — | Opaque, whit |
| 6 | −100 | 4.0 | 0.4 | 8 | $H_3BO_3$ / Ethanol | 0.2 / 0.6 | 4 / 12 | 325° C. | 4,000 psi | — | Opaque, pink glass |
| 6 | −100 | 8.0 | 1.8 | 18 | $NaH_2PO_4$ | 0.2 | 2 | 325° C. | 11,000 psi | 30 | Opaque, pink |
| 6 | −40 + 80 | 3.0 | 0.9 | 22 | $Na_3PO_4$ | 0.1 | 2 | 325° C. | 8,000 psi | — | Opaque, white glassy |
| 6 | −100 | 4.5 | 1.0 | 17 | $NaIO_4$ | 0.5 | 8 | 325° C. | 12,000 psi | 10 | Opaque white glass, cracks |
| 6 | −100 | 4.75 | 0.5 | 9 | $NaBrO_3$ | 0.25 | 5 | 325° C. | 4,000 psi | — | Opaque white glass |
| 6 | −40 + 80 | 5.0 | 0.9 | 15 | $H_3PO_4$ | 0.1 | 2 | 325° C. | 14,000 psi | 30 | Translucent glass |
| 6 | −40 + 80 | 3.0 | 0.9 | 22 | $ZnCl_2$ | 0.1 | 2 | 325° C. | 4,000 psi | — | Translucent glass, cracks |
| 6 | −100 | 2.0 | — | — | $NH_4OH$ | 0.9 | 31 | 325° C. | 4,000 psi | 10 | Transparent glass |
| 6 | −100 | 5.0 | 0.5 | 6 | $NH_4OH$ | 2.25 | 29 | 325° C. | 8,000 psi | 10 | Clear pink glass, cracks |
| 6 | −100 | 2.0 | — | — | Acetic acid | 1.0 | 33 | 325° C. | 4,000 psi | 30 | Compacted with brown edges |
| 6 | −100 | 2.75 | 1.0 | 25 | $SnCl_2$ | 0.25 | 6 | 325° C. | 8,000 psi | 10 | Opaque, green and gray glass |
| 6 | −100 | 2.75 | 0.6 | 17 | Lead phosphate | 0.25 | 7 | 325° C. | 8,000 psi | 10 | Opaque, white glassy |
| 6 | −40 + 80 | 1.0 | 0.45 | 29 | $AlCl_3$ | 0.1 | 6 | 325° C. | 2,000 psi | 5 | Clear glass |
| 6 | −100 | 3.0 | 0.9 | 22 | $H_2SO_4$ | 0.1 | 2 | 375° C. | 10,000 psi | 3 | Opaque, white glassy |
| 8 | −80 | 2.0 | — | — | $NH_4OH$ | 0.45 | 16 | 325° C. | 10,000 psi | 10 | Translucent gray glass |
| 10 | −80 + 100 | 2.0 | — | — | Methanol / $NH_4OH$ | 0.4 / 0.9 | 14 / 31 | 325° C. | 10,000 psi | 10 | Pink glass laminated |

It was found that the glasses of the invention could also be hydromolded employing water-compatible organic modifying components. Hence, whereas depolymerization of the silicate network by water to permit low temperature forming constitutes the basis of the instant invention, it was found that certain organic protonic reagents also possess that capability. Thus, uni-

TABLE VI

| Example No. | Glass Size | Amount Glass | Amount $H_2O$ | % $H_2O$ | Reactant | Amount Reactant | % Reactant | Molding Temperature | Applied Pressure | Time at Temperature | Visual Description |
|---|---|---|---|---|---|---|---|---|---|---|---|
| 6 | −40 + 80 | 5.0 | 0.3 | 5.0 | Methanol | 0.7 | 12 | 325° C. | 14,000 psi | — | Opaque, grainy, tough |
| 6 | −40 + 100 | 3.0 | — | — | Ethylene glycol | 1.0 | 25 | 325° C. | 14,000 psi | 60 | Opaque, gray |
| 6 | −40 + 80 | 5.0 | 0.6 | 9.7 | Ethylene glycol | 0.6 | 10 | 325° C. | 14,000 psi | — | Translucent, glassy |
| 6 | −100 | 3.0 | 0.1 | 2.4 | Furfuryl | 1.0 | 24 | 325° C. | 15,000 psi | 25 | Opaque, black, |

TABLE VI-continued

| Example No. | Glass Size | Amount Glass | Amount H₂O | % H₂O | Reactant | Amount Reactant | Reactant | Molding Temperature | Applied Pressure | Time at Temperature | Visual Description |
|---|---|---|---|---|---|---|---|---|---|---|---|
| 6 | −100 | 5.0 | 1.2 | 17 | alcohol Pyrocatechol | 1.0 | 14 | 325° C. | 12,000 psi | 10 | tough Translucent brown, glassy |
| 6 | −100 | 4.5 | 0.6 | 11 | Mannitol | 0.5 | 9 | 325° C. | 4,000 psi | 1 | Opaque, brown, glassy |
| 6 | −40 + 80 | 3.0 | 0.6 | 16 | Pyrogallol | 0.06 | 2 | 325° C. | 11,000 psi | 10 | Translucent with black particles |
| 6 | −100 | 2.0 | 0.9 | 30 | Glycerol | 0.1 | 3 | 300° C. | 10,000 psi | 20 | Translucent glassy |
| 6 | −100 | 2.0 | 0.5 | 17 | Glycerol | 0.5 | 17 | 300° C. | 10,000 psi | 20 | Translucent, glassy, yellow tint |
| 6 | −100 | 2.0 | — | — | Glycerol | 1.0 | 33 | 300° C. | 10,000 psi | 20 | Compacted, light brown |
| 6 | −100 | 2.0 | 0.5 | 17 | Allyl alcohol | 0.5 | 17 | 300° C. | 10,000 psi | 5 | Translucent glassy |
| 6 | −100 | 2.0 | 0.1 | 3 | Allyl alcohol | 1.0 | 33 | 325° C. | 10,000 psi | 15 | Opaque, yellow |
| 6 | −40 + 100 | 1.75 | 0.5 | 20 | Diphenylsilanediol | 0.25 | 10 | 325° C. | 10,000 psi | 15 | Translucent, bubbly |
| 6 | −40 + 100 | 1.5 | 0.4 | 17 | Diphenylsilanediol | 0.5 | 21 | 325° C. | 10,000 psi | 10 | Translucent, bubbly |
| 6 | −40 + 100 | 1.8 | — | — | Diphenylsilanediol | 0.2 | 10 | 350° C. | 5,000 psi | — | Opaque, grainy |
| 6 | −100 | 5.0 | 0.1 | 2 | Furfuryl alcohol | 0.8 | 14 | 325° C. | 10,000 psi | 15 | Opaque, black, glassy, tough |
| 6 | −100 | 4.0 | 0.5 | 9 | Furfuryl alcohol | 1.0 | 18 | 325° C. | 8,000 psi | 20 | Opaque, black glassy, tough |
| 6 | −100 | 4.0 | 0.5 | 9 | Furan resin | 1.0 | 18 | 325° C. | 8,000 psi | 20 | Opaque, black, glassy, tough |
| 7 | −80 | 1.75 | 0.5 | 20 | 1,4-butynediol | 0.25 | 10 | 300° C. | 10,000 psi | 10 | Opaque, brown glassy |
| 8 | −80 | 2.0 | 0.5* | 17 | Methanol | 0.5 | 17 | 325° C. | 10,000 psi | 10 | Translucent glassy |
| 11 | −40 + 80 | 4.0 | 0.5 | 10 | Ethylene glycol | 0.5 | 10 | 325° C. | 15,000 psi | 1 | Opaque, grainy, tough |
| 11 | −40 + 80 | 3.0 | 0.2 | 6 | Acetonitrile | 0.4 | 11 | 325° C. | 12,000 psi | 1 | Compacted only |

*Concentrated aqueous solution of NH₄OH

As can be recognized from an examination of Tables V and VI, depolymerizers of the silicate network other than water are available. Particularly useful in this regard are ammonium hydroxide and alcohols, the latter having the potential of completely replacing the water.

We claim:

1. A method for molding anhydrous alkali metal silicate material comprising a glass consisting essentially, in mole percent on the oxide basis, of about 3–25% Na₂O and/or K₂O and 50–95% SiO₂, the sum of those components constituting at least 55% of the total composition, into a solid glass article containing about 5–50% by weight water and/or other protonic reagent capable of depolymerizing the silicate network which consists in the steps of:
    (a) mixing said anhydrous silicate materials which have a thickness dimension not exceeding about 15 mm. with said water and/or other protonic reagent; and then
    (b) forming said mixture into said solid glass article by molding at a temperature of at least 100° C. and at a pressure of at least 500 psi within a closed system.

2. A method according to claim 1 wherein said mixture of anhydrous silicate material with water and/or other protonic reagent is molded at a temperature between about 100° C.–500° C.

3. A method according to claim 2 wherein said temperature ranges between about 200°–350° C.

4. A method according to claim 1 wherein said mixture of anhydrous silicate material with water and/or other protonic reagent is molded at pressures between about 500–25,000 psi.

5. A method according to claim 1 wherein said other protonic reagent is selected from the group consisting of NH₄OH and alcohols.

6. A method for making a solid alkali metal silicate glass article containing about 5–50% by weight water and/or other protonic reagent capable of depolymerizing a silicate network which consists in the steps of:
    (a) mixing together batch components suitable for making an anhydrous alkali metal silicate glass consisting essentially, in mole percent on the oxide basis, of about 3–25% Na₂O and/or K₂O and 50–95% SiO₂, the sum of those components constituting at least 55% of the total composition, with said water and/or other protonic reagent, said batch components having thickness dimensions not exceeding about 15 mm.; and then
    (b) molding said mixture within a closed system into a solid glass article containing about 5–50% by weight water and/or other protonic reagent at a temperature of at least 100° C. and at a pressure of at least 500 psi.

7. A method according to claim 6 wherein said molding is carried out at about 100°–500° C.

8. A method according to claim 6 wherein said temperature ranges between about 200°–350° C.

9. A method according to claim 6 wherein said molding is carried out at pressures between about 500–25,000 psi.

10. A method according to claim 6 wherein said other protonic reagent is selected from the group consisting of NH₄OH and alcohols.

* * * * *

UNITED STATES PATENT AND TRADEMARK OFFICE
CERTIFICATE OF CORRECTION

PATENT NO. : 4,142,878
DATED : March 6, 1979
INVENTOR(S) : Anthony R. Olszewski and Donald R. Parnell It is certified that error appears in the above–identified patent and that said Letters Patent are hereby corrected as shown below:

Column 3, line 10, after "cracking" insert --and/or delaminating of the body may occur. Also, higher--.

Columns 7 and 8, Table V, line 25:

Under heading "Amount Glass", change "1.0" to --5.0--.

Under heading "Amount $H_2O$", change "17" to --1.0--.

Under heading "% $H_2O$", change "NaOH" to --17--.

Under heading "Reactant", change "0.007" to --NaOH--.

Under heading "% Reactant", change "325+C" to --0.1--.

Under heading "Molding Temperature", change "14000 psi" to --325°C--.

Under heading "Applied Pressure", change "-" to --14,000 psi--.

Under heading "Time at Temperature", change "Clear glass" to -- - --.

UNITED STATES PATENT AND TRADEMARK OFFICE
CERTIFICATE OF CORRECTION

PATENT NO. : 4,142,878

DATED : March 6, 1979

INVENTOR(S) : Anthony R. Olszewski and Donald R. Parnell

It is certified that error appears in the above–identified patent and that said Letters Patent are hereby corrected as shown below:

Under heading "Visual Description", insert --Clear glass--.

Signed and Sealed this

Eighth Day of April 1980

[SEAL]

Attest:

SIDNEY A. DIAMOND

*Attesting Officer*     *Commissioner of Patents and Trademarks*